(12) United States Patent
Kinoshita et al.

(10) Patent No.: US 9,869,330 B2
(45) Date of Patent: Jan. 16, 2018

(54) MULTIPIECE TOLERANCE RING

(71) Applicants: Yosuke Kinoshita, Nagano (JP); Yoshinori Kamiya, Nagano (JP)

(72) Inventors: Yosuke Kinoshita, Nagano (JP); Yoshinori Kamiya, Nagano (JP)

(73) Assignee: SAINT-GOBAIN PERFORMANCE PLASTICS RENCOL LIMITED, Coventry (GB)

(*) Notice: Subject to any disclaimer, the term of this patent is extended or adjusted under 35 U.S.C. 154(b) by 556 days.

(21) Appl. No.: 13/931,497

(22) Filed: Jun. 28, 2013

(65) Prior Publication Data
US 2014/0016999 A1 Jan. 16, 2014

Related U.S. Application Data

(60) Provisional application No. 61/666,352, filed on Jun. 29, 2012.

(51) Int. Cl.
| F16B 2/00 | (2006.01) |
| B25J 17/02 | (2006.01) |
| F16D 1/08 | (2006.01) |

(52) U.S. Cl.
CPC ............... *F16B 2/00* (2013.01); *B25J 17/02* (2013.01); *F16D 1/0835* (2013.01); *Y10T 403/7058* (2015.01)

(58) Field of Classification Search
CPC .... F16D 1/06; F16D 1/0835; Y10T 403/7047; Y10T 403/7061
See application file for complete search history.

(56) References Cited

U.S. PATENT DOCUMENTS

| 2,931,412 A * | 4/1960 | Wing ................. F01L 1/047 29/451 |
| 3,700,271 A | 10/1972 | Bloaurock et al. |

(Continued)

FOREIGN PATENT DOCUMENTS

| CA | 1111354 | 10/1981 |
| CA | 1320978 C | 8/1993 |

(Continued)

OTHER PUBLICATIONS

International Search Report from PCT Application No. PCT/GB2013/051730, dated Aug. 30, 2013, 1 pg.

(Continued)

*Primary Examiner* — Michael P Ferguson
(74) *Attorney, Agent, or Firm* — Chi S. Kim; Abel Law Group, LLP

(57) ABSTRACT

A tolerance ring can include a generally cylindrical body having a first partial-cylindrical sidewall and a second partial-cylindrical sidewall opposite the first partial-cylindrical sidewall. Each partial-cylindrical sidewall defines a first end and a second end. Further, a first gap can be established between the first end of the first partial-cylindrical sidewall and the first end of the second partial-cylindrical sidewall after installation around a post. The first gap can extend along the entire length of the tolerance ring such that a split is formed in the tolerance ring. The tolerance ring can also include a second gap between the second end of the first partial-cylindrical sidewall and the second end of the second partial-cylindrical sidewall. The second gap can extend along the entire length of the tolerance ring such that a split is formed in the tolerance ring. The tolerance ring can provide an installed concentricity, C, ≤50 μm.

12 Claims, 13 Drawing Sheets

(56) References Cited

U.S. PATENT DOCUMENTS

| | | | |
|---|---|---|---|
| 4,699,403 A | 10/1987 | Wong | |
| 4,764,095 A | 8/1988 | Fickelscher | |
| 4,767,276 A | 8/1988 | Barnes et al. | |
| 4,790,683 A | 12/1988 | Cramer, Jr. et al. | |
| 4,981,390 A | 1/1991 | Cramer, Jr. et al. | |
| 5,059,042 A | 10/1991 | Grierson | |
| 5,125,755 A | 6/1992 | Adler et al. | |
| 5,308,183 A * | 5/1994 | Stegeman | F16D 1/096 403/258 |
| 5,509,667 A | 4/1996 | Klein et al. | |
| 5,655,865 A | 8/1997 | Hilti Aktiengeschaft | |
| 5,839,835 A | 11/1998 | Zernickel et al. | |
| 6,333,839 B1 | 12/2001 | Misso et al. | |
| 6,480,363 B1 | 11/2002 | Prater | |
| 6,883,836 B2 | 4/2005 | Breay et al. | |
| 7,007,386 B1 | 3/2006 | Stover | |
| 7,343,989 B2 | 3/2008 | Underwood | |
| 7,554,771 B2 | 6/2009 | Hanrahan et al. | |
| 7,580,225 B2 | 8/2009 | Hanrahan et al. | |
| 7,583,476 B2 | 9/2009 | Hanrahan et al. | |
| 7,611,303 B2 | 11/2009 | Hanrahan et al. | |
| 7,618,098 B2 * | 11/2009 | Frear | E21C 35/197 299/102 |
| 7,670,079 B2 | 3/2010 | Snadden et al. | |
| 7,811,175 B2 | 10/2010 | Schneider et al. | |
| 7,850,389 B2 | 12/2010 | Hanrahan et al. | |
| 7,909,369 B2 | 3/2011 | Kertesz et al. | |
| 7,922,418 B2 | 4/2011 | Baker et al. | |
| 7,957,103 B2 | 6/2011 | Woodhead et al. | |
| 7,958,637 B2 | 6/2011 | Hughes | |
| 7,978,437 B2 | 7/2011 | Hanrahan et al. | |
| 8,448,950 B2 | 5/2013 | Sato et al. | |
| 8,684,624 B2 | 4/2014 | Slayne | |
| 9,145,925 B2 | 9/2015 | Nakamura et al. | |
| 2004/0076356 A1 | 4/2004 | Kapaan et al. | |
| 2007/0096572 A1* | 5/2007 | Watkins | F16C 27/04 310/90 |
| 2007/0291417 A1 | 12/2007 | Woodhead et al. | |
| 2008/0199254 A1 | 8/2008 | Baker et al. | |
| 2009/0042657 A1 | 2/2009 | Schneider et al. | |
| 2010/0003076 A1 | 1/2010 | Slayne | |
| 2010/0073820 A1 | 3/2010 | Slayne et al. | |
| 2010/0143075 A1 | 6/2010 | Disser | |
| 2011/0076096 A1 | 3/2011 | Slayne et al. | |
| 2011/0085752 A1 | 4/2011 | Tecza et al. | |
| 2011/0150375 A1 | 6/2011 | Jaeger et al. | |
| 2011/0150377 A1 | 6/2011 | Hartmann | |
| 2011/0176757 A1 | 7/2011 | Heldmann et al. | |
| 2011/0247891 A1 | 10/2011 | Meyer et al. | |
| 2011/0309611 A1 | 12/2011 | Smith | |
| 2012/0087044 A1 | 4/2012 | Schmidt et al. | |
| 2013/0105267 A1 | 5/2013 | Nakamura et al. | |
| 2014/0313618 A1 | 10/2014 | Araki et al. | |

FOREIGN PATENT DOCUMENTS

| | | |
|---|---|---|
| CA | 2736810 A1 | 3/2010 |
| CN | 1402871 A | 3/2003 |
| CN | 101065798 A | 10/2007 |
| CN | 101140013 A | 3/2008 |
| CN | 101255884 A | 9/2008 |
| CN | 102124241 A | 7/2011 |
| CN | 102177357 A | 9/2011 |
| CN | 104011798 A | 8/2014 |
| DE | 19855538 A1 | 12/1998 |
| DE | 102004051396 A1 | 4/2006 |
| DE | 102008028371 A1 | 12/2009 |
| EP | 1184583 A1 | 3/2002 |
| EP | 0687822 B2 | 9/2004 |
| EP | 2054885 B1 | 2/2011 |
| FR | 2627620 A3 | 8/1989 |
| GB | 722068 A | 1/1955 |
| GB | 856486 A | 12/1960 |
| GB | 895787 A | 5/1962 |
| GB | 1120661 A | 7/1968 |
| GB | 1377446 A | 12/1974 |
| GB | 1393529 A | 5/1975 |
| GB | 2198780 A | 6/1987 |
| GB | 2459959 A | 11/2009 |
| JP | 8247359 A | 9/1996 |
| JP | 2003139154 A | 5/2003 |
| JP | 2005-344745 A | 12/2005 |
| JP | 2008-520926 A | 6/2008 |
| JP | 2011-052715 A | 3/2011 |
| JP | 2011526669 A | 10/2011 |
| JP | 2012052638 A | 3/2012 |
| KR | 20110056313 A | 5/2011 |
| RU | 2119443 C1 | 9/1998 |
| WO | 88/07285 | 9/1988 |
| WO | 0131211 A1 | 5/2001 |
| WO | 2009136539 A1 | 11/2009 |
| WO | 2011036126 A1 | 3/2011 |
| WO | 2012029841 A1 | 3/2012 |
| WO | 2013164606 A1 | 11/2013 |
| WO | 2014001818 A1 | 1/2014 |

OTHER PUBLICATIONS

International Search Report from PCT Application No. PCT/GB2013/051115, dated Jul. 4, 2013, 1 pg.

* cited by examiner

MULTIPIECE TOLERANCE RING

CROSS-REFERENCE TO RELATED APPLICATION(S)

This application claims priority under 35 U.S.C. §119(e) to U.S. Patent Application No. 61/666,352 entitled "MULTIPIECE TOLERANCE RING," by Yosuke Kinoshita and Yoshinori Kamiya, filed Jun. 29, 2012, which is assigned to the current assignee hereof and incorporated herein by reference in its entirety.

BACKGROUND

Field of the Disclosure

The present disclosure is directed to tolerance rings, particularly to tolerance rings for joints within robots.

Description of the Related Art

The present disclosure relates to tolerance ring assemblies, wherein a tolerance ring provides an interference fit between parts of an assembly, in which a first part has a cylindrical portion located in a cylindrical bore of a second part. In particular, the present disclosure relates to assemblies having a tolerance ring that provides an interference fit between a cylindrical component such as a shaft or a bearing and a housing for the shaft.

Improved engineering techniques have resulted in the need for greater accuracy of machine parts, raising manufacturing costs. Very close tolerances are required where press fits, splines, pins or keyways are employed to transmit torque in applications such as pulleys, flywheels or driveshafts.

Tolerance rings may be used to provide an interference fit between parts required to transmit torque. Tolerance rings provide a low cost means of providing an interference fit between parts that may not be machined to exact dimensions. Tolerance rings have a number of other potential advantages, such as compensating for different linear coefficients of expansion between the parts, allowing rapid apparatus assembly, and durability.

A tolerance ring generally comprises a strip of resilient material, for example a metal such as spring steel, the ends of which are brought together to form a ring. A band of protrusions extend radially outwards from the ring, or radially inwards towards the center of the ring. Usually, the protrusions are formations, possibly regular formations, such as corrugations, ridges or waves.

When the ring is located in the annular space between, for example, a shaft and a bore in a housing in which the shaft is located, the protrusions can be compressed. Each protrusion can act as a spring and to exert a radial force against the shaft and the surface of the bore, providing an interference fit between the shaft and the housing. Rotation of the housing or the shaft will produce similar rotation in the other of the shaft or the housing, as torque is transmitted by the tolerance ring. Typically, the band of protrusions is axially flanked by annular regions of the ring that have no formations (known in the art as "unformed regions" of the tolerance ring).

Although tolerance rings usually comprise a strip of resilient material that is curved to allow the easy formation of a ring by overlapping the ends of the strip, a tolerance ring may also be manufactured as an annular band. The term "tolerance ring" as used hereafter includes both types of tolerance ring. The term "shaft" as used hereafter includes any assembly component with a cylindrical portion, such as a shaft or a bearing.

Accordingly, the industry continues to need improvements in tolerance rings, particularly tolerance rings installed within robots.

BRIEF DESCRIPTION OF THE DRAWINGS

The present disclosure can be better understood, and its numerous features and advantages made apparent to those skilled in the art by referencing the accompanying drawings.

The use of the same reference symbols in different drawings indicates similar or identical items.

DETAILED DESCRIPTION

The following description is directed to tolerance rings, and particularly, to tolerance rings that can be installed within a joint assembly of a robot between a bore formed in an arm of the robot and a drive shaft of a servomotor. In one aspect, a tolerance ring can be fitted around the drive shaft and then the arm can be inserted over the drive shaft/tolerance ring assembly. Alternatively, the tolerance ring can be inserted into the bore of the arm and the arm/tolerance ring can be fitted over the drive shaft.

In a typical tolerance ring, the waves nearest to the gap tend to be the weakest, i.e., least stiff, since the waves have a gap on one side and material on the other and the remaining waves in the tolerance ring are flanked by material on both sides. This variation in stiffness can cause performance variables, e.g., resonance and alignment, to be very dependent on a position of the gap within the joint assembly. Attempting to optimize the gap location for one performance parameter can adversely affect other performance parameters. This, in turn, can compromise overall performance.

A tolerance ring according to one or more of the embodiments described herein can include a multiple pieces of the tolerance ring separate by gaps, or full splits, extending the length of the tolerance ring. The gaps can be located opposite to each other and the opposing gaps of the multi-piece tolerance ring can balance any force differential that would otherwise be attributed to a single gap.

The multi-piece tolerance rings disclosed herein can provide a tolerance ring having a stiffness that is balanced on opposite pieces of the multi-piece tolerance ring. As such, a multi-piece tolerance ring in accordance with any of the embodiments herein, or combinations thereof, can provide a relatively precise concentricity between a drive shaft and a bore within an robot arm in which the drive shaft and tolerance ring are installed. As such, any load imbalances on the servomotor for the drive shaft can be substantially reduced and the life of the servomotor can be substantially increased.

Figure 1:
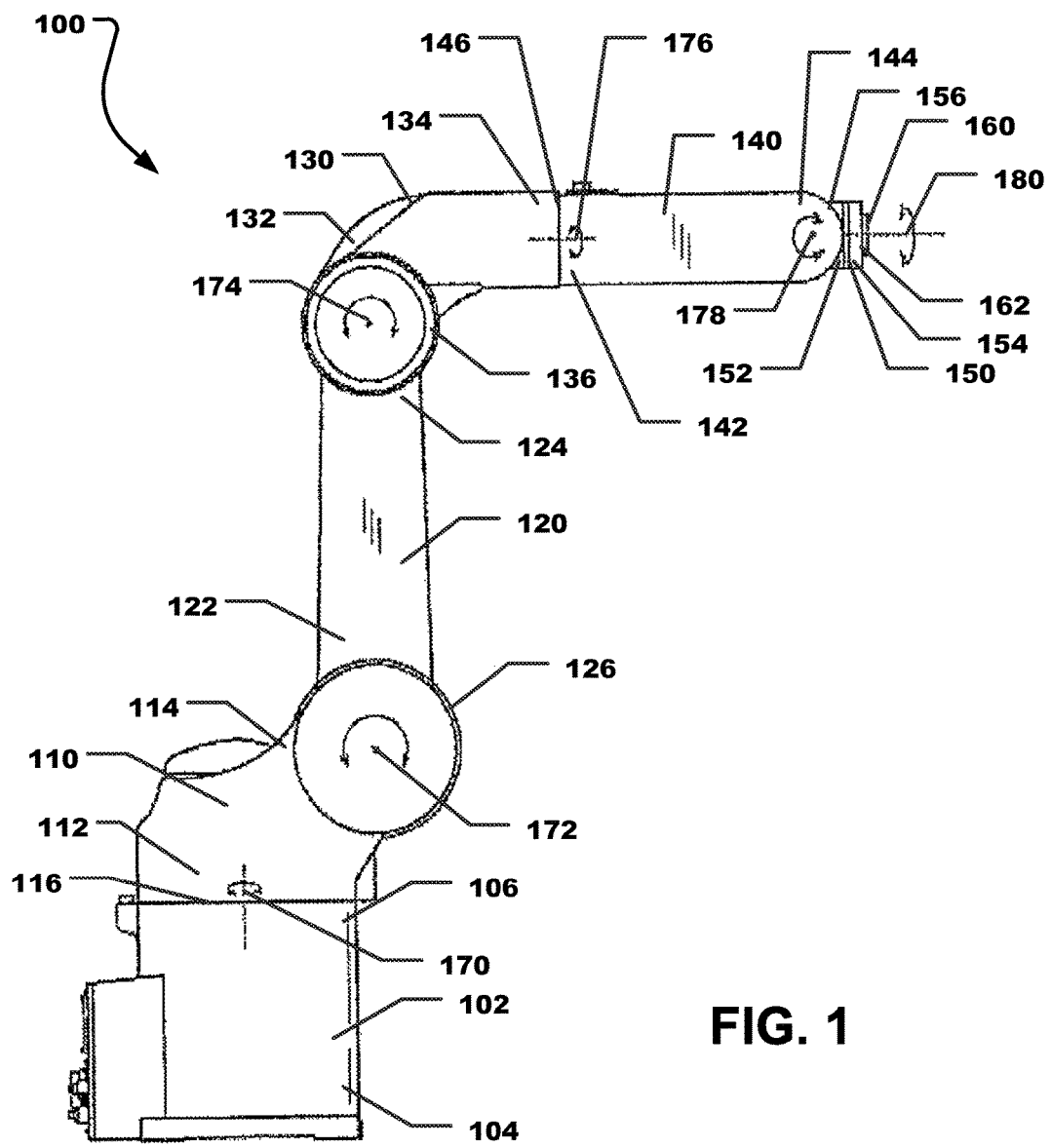
FIG. 1 includes a side plan view of a multi-joint robot in accordance with an embodiment.

Referring initially to FIG. 1, a multi-joint robot is illustrated and is generally designated 100. The multi-joint robot 100 can include a base 102 having a proximal end 104 and a distal end 106. A shoulder 110 having a proximal end 112 and a distal end 114 can be rotatably coupled to the base 102. Specifically, the proximal end 112 of the shoulder 110 can be connected to the distal end 106 of the base 102 via a first joint 116.

FIG. 1 further indicates that a lower arm 120 having a proximal end 122 and a distal end 124 can be rotatably coupled to the shoulder 110. In particular, the proximal end 122 of the lower arm 120 can be coupled to the distal end 114 of the shoulder 110 via a second joint 126. The multi-joint robot 100 can also include an upper arm 130 having a proximal end 132 and a distal end 134. The upper arm 130 can be rotatably connected to the lower arm 120. Specifically, the proximal end 132 of the upper arm 130 can be connected to the distal end 124 of the lower arm 120 via a third joint 136.

As further depicted in FIG. 1, the multi-joint robot 100 can include a wrist 140 having a proximal end 142 and a distal end 144. In particular, the proximal end 142 of the wrist 140 can rotatably coupled to the distal end 134 of the upper arm 130 via a fourth joint 146. The multi-joint robot 100 can also include a hand mount 150 that includes a proximal end 152 and a distal end 154. The proximal end 152 of the hand mount 150 can be connected to the distal end 144 of the wrist 140 via a fifth joint 156. Moreover, a gripping flange 160 can be connected to the distal end 154 of the hand mount 150 via a sixth joint 166.

In a particular aspect, the gripping flange 160 can be provided with a tool connector, e.g., a threaded hole (not shown), that can accommodate the detachable connection of a hand (not shown) or any other tool (not shown) to the multi-joint robot 100.

Each joint 116, 126, 136, 146, 146, 166, or joint device, can include or be coupled to at least one servomotor (not shown) and at least one speed reducer (not shown). Further, a robot controller (not shown) can be in communication with each servomotor and each speed reducer in order to control the servomotors and speed reducers. In response to the actuation of the servomotors, the respective joints 116, 126, 136, 146, 156, 166 are adapted to be actuated for the rotation of the shoulder 110, the lower arm 120, the upper arm 130, the wrist 140, the hand mount 150, and the gripping flange 160 about the respective axes, described below. Under the control of the robot controller, various motions can be performed by the multi-joint robot 100.

In order to provide precise rotation, each joint 116, 126, 136, 146, 156, 166 can include a multi-piece tolerance ring, described below, that is configured to provide an interference fit between an inner component, such as a drive shaft of a servomotor, and an outer component, such as an arm having a bore. The multi-piece tolerance ring can provide a relatively precise concentricity between the assembled components which can extend the life of the motor. Otherwise, increased concentricity can lead to increased loads on the motor, which can lead to premature failure of the motor.

During operation, the shoulder 110 can rotate with respect to the base 102 through a horizontal plane about a vertical axis 170. The lower arm 120 can rotate with respect to the base 102 through a vertical plane about axis 172 and the upper arm 130 can rotate with respect to the lower arm 120 also through a vertical plane about axis 174. The wrist 140 can rotate with respect to the upper arm 130 about axis 176. Further, the hand mount 150 an rotate with respect to the wrist 140 about axis 178 and the gripping flange 160 can rotate with respect the hand mount 150 about axis 180.

Accordingly, the multi-joint robot 100 includes six axes 170, 172, 174, 176, 178, 180 of motion and the multi-joint robot 100 can be used a vertically articulated six-axis assembler.

Figure 2:
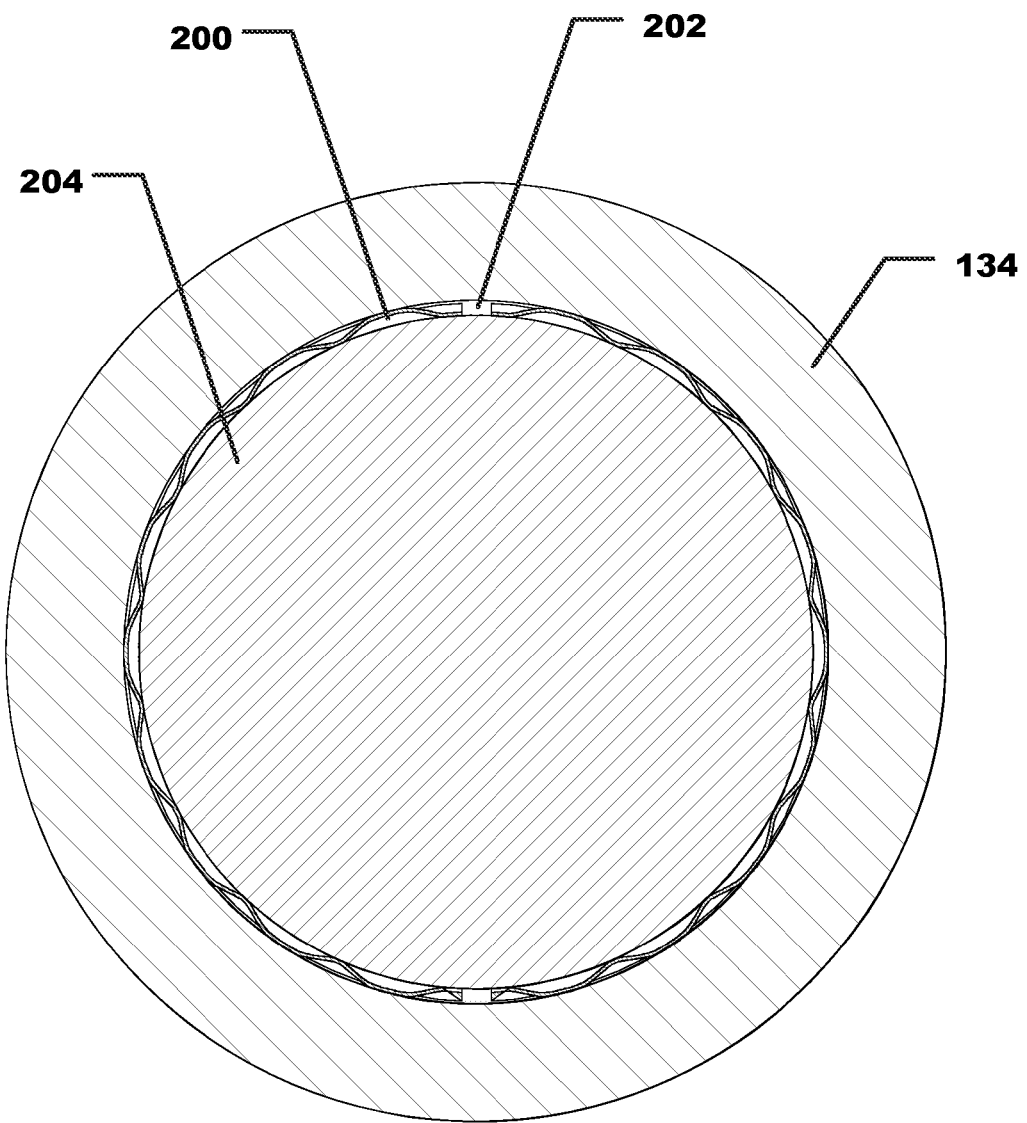
FIG. 2 includes a first cross-sectional view of a pivot joint of a robot in accordance with an embodiment.

As illustrated in FIG. 2, and described in greater detail below, a tolerance ring 200 can be installed within the upper arm 130 of the multi-joint robot 100. Specifically, the proximal end 132 of the upper arm 130 of the multi-joint robot 100 can be formed with a bore 202 and drive shaft 204 of a servomotor (not shown) can be installed within the bore 202. Further, the tolerance ring 200 can be installed between the drive shaft 204 (an inner component) and the upper arm 130 (an outer component) within the bore 202. The tolerance ring 200 can be configured to engage the inner wall of the bore 202 and the outer wall of the drive shaft 204 in order to maintain the drive shaft 204 within the upper arm 130 in an interference fit. The tolerance ring 200 can account for dimensional variations by at least partially deforming, or compressing, between the drive shaft 204 and the bore 202 during installation.

Figure 4:
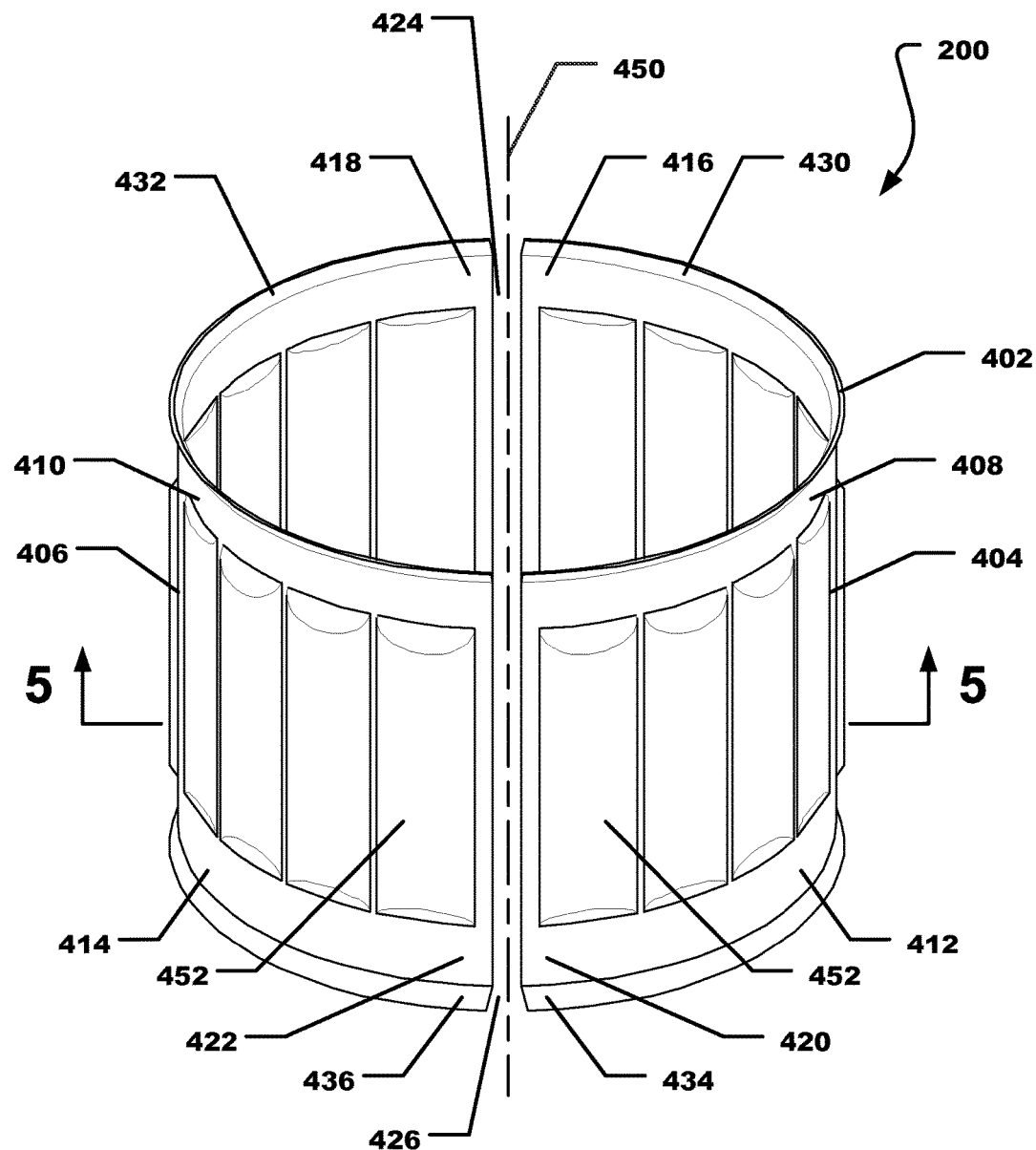
FIG. 4 includes a perspective view of a tolerance ring in accordance with an embodiment.
Figure 5:
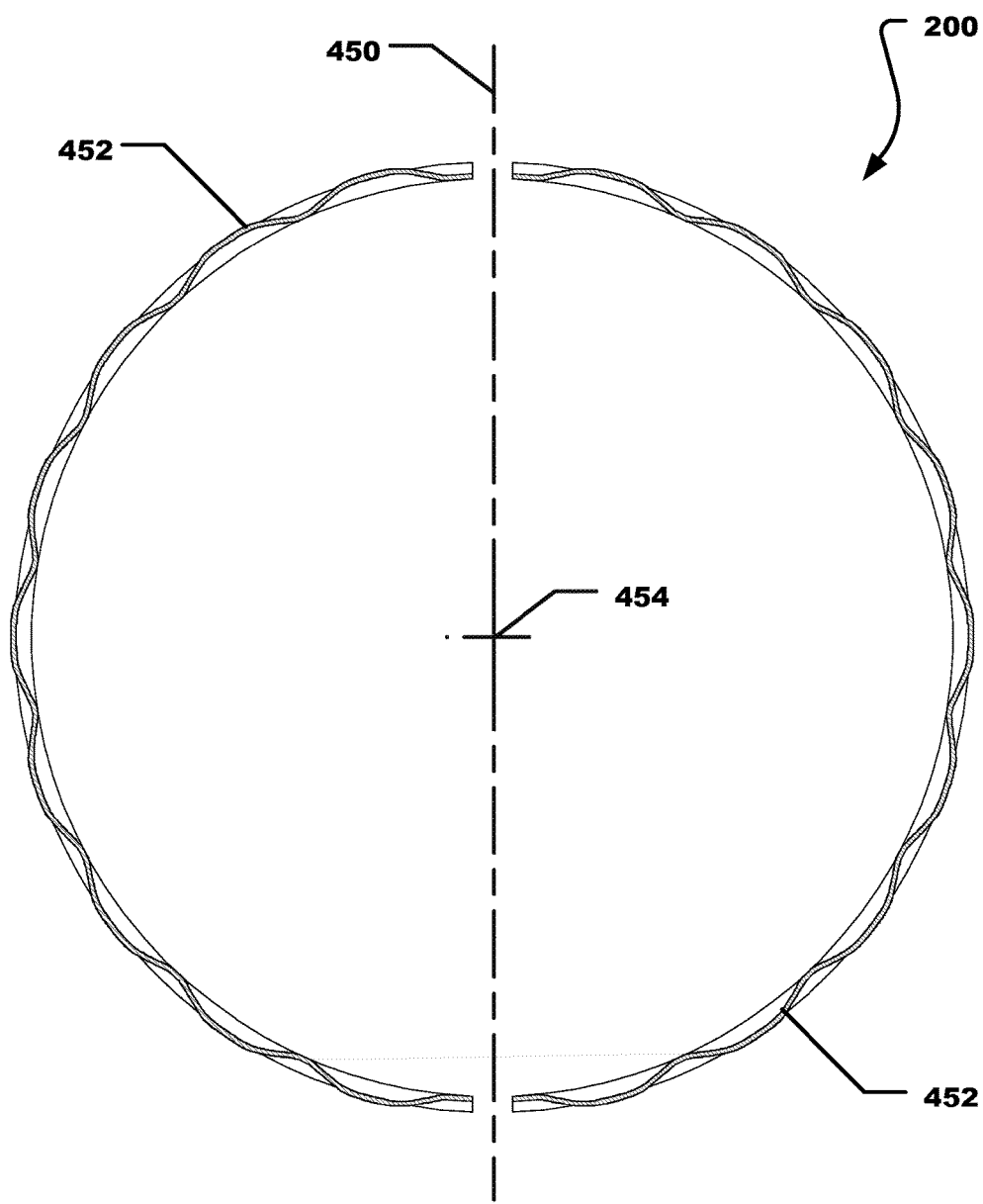
FIG. 5 includes a cross-sectional view of a tolerance ring in accordance with an embodiment taken along Line 5-5 in FIG. 4.

Referring now to FIG. 4 and FIG. 5, details concerning the tolerance ring 200 are illustrated. As depicted, the tolerance ring 200 can include a generally cylindrical body 402 having a first partial-cylindrical side wall 404 and a second partial-cylindrical sidewall 406. The generally cylindrical body 402 can include two partial-cylindrical sidewalls 404, 406 as illustrate and these sidewalls 404, 406 can be hemicylindrical.

Each sidewall 404, 406 can include a top 408, 410 and a bottom 412, 414. Further, each sidewall 404, 406 can include a first end 416, 418 and a second end 420, 422. Moreover, a first gap 424 can be established between the first end 416 of the first sidewall 404 and the first end 418 of the second sidewall 406. A second gap 426 can be formed, or otherwise established, between the second end 420 of the first sidewall 404 and the second end 422 of the second sidewall 406. Each gap 424, 426 can extend along the entire length of the body 402 and each gap 424, 426 can establish a complete split along the length of the body 402.

Figure 3:
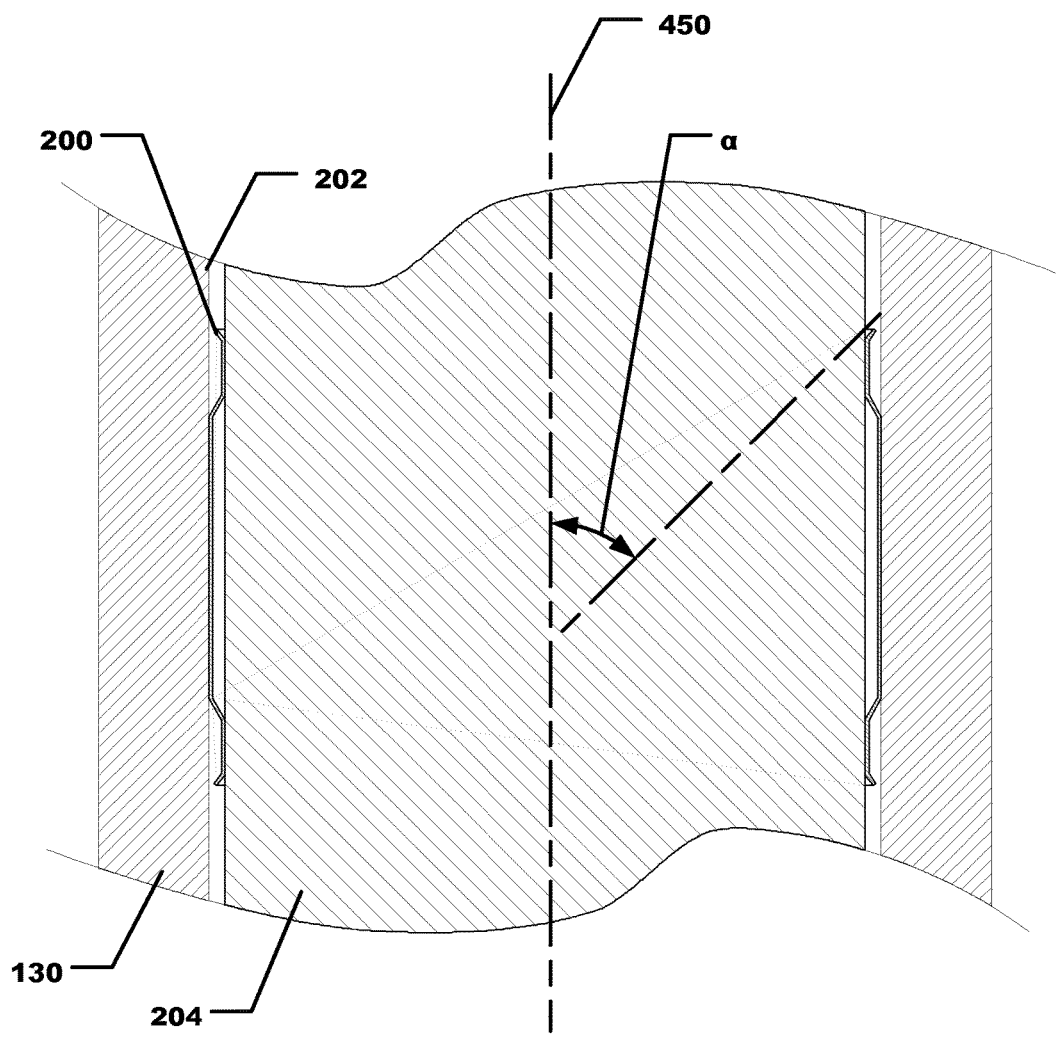
FIG. 3 includes a second cross-sectional view of a pivot joint of a robot in accordance with an embodiment.

As indicated in FIG. 3, the body 402 of the tolerance ring 122 can further include an upper flange that can include a first upper flange portion 430 extending from the top 408 of the first sidewall 404 and a second upper flange portion 432 extending from the top 410 of the second sidewall 406. Moreover, the body 402 can include a lower flange that can include a first lower flange portion 434 extending from the bottom 412 of the first sidewall 404 and a second lower flange portion 436 extending from the bottom 414 of the second sidewall 404.

The tolerance ring 200 can also include a central axis 450 and as shown in FIG. 3 and FIG. 4, in a particular aspect, the flanges 430, 432, 434, 436 can be angled in an outward direction with respect to the central axis 450 of the tolerance ring 200. It is to be understood that the flanges 430, 432, 434, 436 can be angled in an inward direction with respect to the central axis 450. In either case, the flanges 430, 432, 434, 436 can form an angle, α, with respect the central axis 450. In a particular aspect, α can be ≥5°, such as ≥10°, or ≥15°. In another aspect, a can be ≤30°, such as ≤25°, or ≤20°. In another aspect, α can be within a range between, and including, any of the values disclosed above.

As most clearly illustrated in FIG. 3, the tolerance ring 200 may include an overall wall thickness, $t_{OW}$, that is the distance between the inner surface of each sidewall 404, 406 of the tolerance ring 200 and an outer surface of a wall structure formed in each sidewall 404, 406 of the tolerance ring 200. Further, each flange 430, 432, 434, 436 can extend from the sidewall 404, 406 such that each flange 430, 432, 434, 436 can have an overall flange thickness, $t_{OF}$, that is the distance between the inner surface of each sidewall 404, 406 of the tolerance ring 200 and the outer edge of each flange 430, 432, 434, 436, respectively. In a particular aspect, $t_{OF}$ can be ≥30% $t_{OW}$, such as ≥35% $t_{OW}$, ≥40% $t_{OW}$, ≥45% $t_{OW}$, ≥50% $t_{OW}$, ≥55% $t_{OW}$, or ≥60% $t_{OW}$. Further, $t_{OF}$ can be ≤98% $t_{OW}$, such as ≤95% $t_{OW}$, ≤90% $t_{OW}$, ≤85% $t_{OW}$, or ≤80% $t_{OW}$. In another aspect, $t_{OF}$ can be within a range between, and including, any of the percentage values of $t_{OW}$ disclosed above.

In certain embodiments that include flanges and wall structures that extend in an inward direction relative to the central axis 450, $t_{OW}$ can be measured between an outer surface of each sidewall 404, 406 of the tolerance ring 200 and an inner surface of a wall structure formed in the sidewall 404, 406 of the tolerance ring 200. Further, in such embodiments, $t_{OF}$ is measured between the outer surface of each sidewall 404, 406 of the tolerance ring 200 and the inner edge of each flange 430, 432, 434, 436, respectively.

Referring to FIG. 2 through FIG. 5, the tolerance ring 200 can include a plurality of waves 452 formed in each sidewall 404, 406 of the body 402. As illustrated, in one aspect, the waves 452 can extend in an outward direction with respect to the central axis 450. However, in another aspect, the waves 452 can extend in an inward direction with respect to the central axis 450.

The waves 452 can be formed, or otherwise arranged, in each sidewall 404, 406 of the body 402 so that the tolerance ring 200 can include a plurality of elongated waves extending substantially along the length of each sidewall 404,406 and in a pattern such that the elongated waves 452 are equally spaced circumferentially along each sidewall 404, 406 of the body 402 of the tolerance ring 200. Further, each wave 452 on the first sidewall 404 is opposite a wave 452 on the second sidewall 406. An axis passing through a center 454 of the tolerance ring 200 that bisects a wave 452 on the first sidewall 404 can also bisect a wave 452 on the second sidewall 406.

Specifically, a first plurality of wave structures, or waves 452, can be evenly spaced along the perimeter of the first partial-cylindrical sidewall 404 between the first end 416 of the first partial-cylindrical sidewall 404 and the second end 420 of the first partial-cylindrical sidewall 404 and the second plurality of wave structures can be evenly spaced along the perimeter of the second partial-cylindrical sidewall 406 between the first end 418 of the second partial-cylindrical sidewall 406 and the second end 422 of the second partial-cylindrical sidewall 406.

In a particular aspect, the first partial-cylindrical sidewall 404 can include an equal number of wave structures as the second partial-cylindrical sidewall 406. Each of the first plurality of wave structures can be opposed by one of the second plurality of wave structures to establish an opposed pair of wave structures.

In a particular aspect, for any pair of opposing waves 452, the first wave of the pair can include an installed engagement force, $F_1$, between the first wave and the wall of the bore 202. The second wave of the pair can include an installed engagement force, $F_2$, between the second wave and the wall of the bore 202. In a particular aspect, $F_1$ can be ≥90% $F_2$, such as ≥95% $F_2$, ≥96% $F_2$, ≥97% $F_2$, ≥98% $F_2$, or ≥99% $F_2$. Further, $F_1$ can be substantially equal to $F_2$. In another aspect, $F_1$ can be ≤110% $F_2$, such as ≤105% $F_2$, ≤104% $F_2$, ≤103% $F_2$, ≤102% $F_2$, or ≤101% $F_2$. $F_1$ can be within a range between and including any of the percentage of $F_2$ values described above.

In another aspect, $F_2$ can be ≥90% $F_1$, such as ≥95% $F_1$, ≥96% $F_1$, ≥97% $F_1$, ≥98% $F_1$, or ≥99% $F_1$. Further, $F_2$ can be substantially equal to $F_1$. In another aspect, $F_2$ can be ≤110% $F_1$, such as ≤105% $F_1$, ≤104% $F_1$, ≤103% $F_1$, ≤102% $F_1$, or ≤101% $F_1$. Additionally, $F_2$ can be within a range between and including any of the percentage of $F_1$ values described above.

The tolerance ring 200 can include a total number of wave structures, $W_T$. $W_T$ can be an even integer and $W_T$ can be ≥4, such as ≥6, ≥8, ≥10, ≥12, ≥14, ≥16, ≥18, or ≥20. Further, $W_T$ can be ≤500, ≤250, ≤100, ≤90, ≤80, ≤70, ≤60, or ≤50.

In a particular aspect, the balanced forces across the tolerance ring 200 for any pair of wave 452 can allow the tolerance ring 200 to provide a concentricity, C, can be ≤50 μm, wherein the concentricity is a distance measured between a center of an inner component, e.g., the driveshaft 204, and a center of an outer component, e.g., the upper arm 130. In another aspect, C can be ≤45 μm, such as ≤40 μm, ≤35 μm, ≤30 μm, ≤25 μm, or ≤20 μm. C can also be ≥5 μm, such as ≥6 μm, ≥7 μm, ≥8 μm, ≥9 μm, ≥10 μm, ≥11 μm, ≥12 μm, ≥13 μm, ≥14 μm, or ≥15 μm. Further, C can be within a range between and including any of the values of C above. In a particular aspect, C can be measured after the tolerance ring is installed around an inner component between the inner component and an outer component.

In yet another aspect, wherein the first gap 424 can include a first installed gap width, $GW_1$, and the second gap 426 can include a second installed gap width, $GW_2$. In this aspect, $GW_1$ can be ≥95% $GW_2$, such as ≥96% $GW_2$, ≥97% $GW_2$, ≥98% $GW_2$, or ≥99% $GW_2$. Further, $GW_1$ can be ≤105% $GW_2$, such as ≤104% $GW_2$, ≤103% $GW_2$, ≤102% $GW_2$, ≤101% $GW_2$, or ≤100% $GW_2$. In another aspect, $GW_1$ can be =100% $GW_2$. Further, $GW_1$ can be within a range between and including any of the percentage of $GW_2$ values described above.

In another aspect, $GW_2$ can be ≥95% $GW_1$, such as ≥96% $GW_1$, ≥97% $GW_1$, ≥98% $GW_1$, or ≥99% $GW_1$. Further, $GW_2$ can be ≤105% $GW_1$, such as ≤104% $GW_2$, ≤103% $GW_1$, ≤102% $GW_1$, ≤101% $GW_1$, or ≤100% $GW_1$. In another aspect, $GW_2$ can be =100% $GW_1$. Further, $GW_2$ can be within a range between and including any of the percentage of $GW_1$ values described above. $GW_1$ and $GW_2$ can be measured after the tolerance ring is installed around an inner component between the inner component and an outer component.

In still another aspect, the tolerance ring comprises an inner diameter, ID, $GW_1=GW_2$, and a ratio, R, of ID to $GW_1$ can be ≥10:1, such as R≥12:1, R≥14:1, R≥16:1, R≥18:1, R≥20:1, R≥25:1, or R≥30:1. Further, R can be ≤100:1, such as R≤75:1, or R≤50:1. R can be within a range between and including of any of the values described above. In this aspect, $GW_1$, $GW_2$, and ID can be measured after the tolerance ring is installed around an inner component between the inner component and an outer component.

Figure 6:
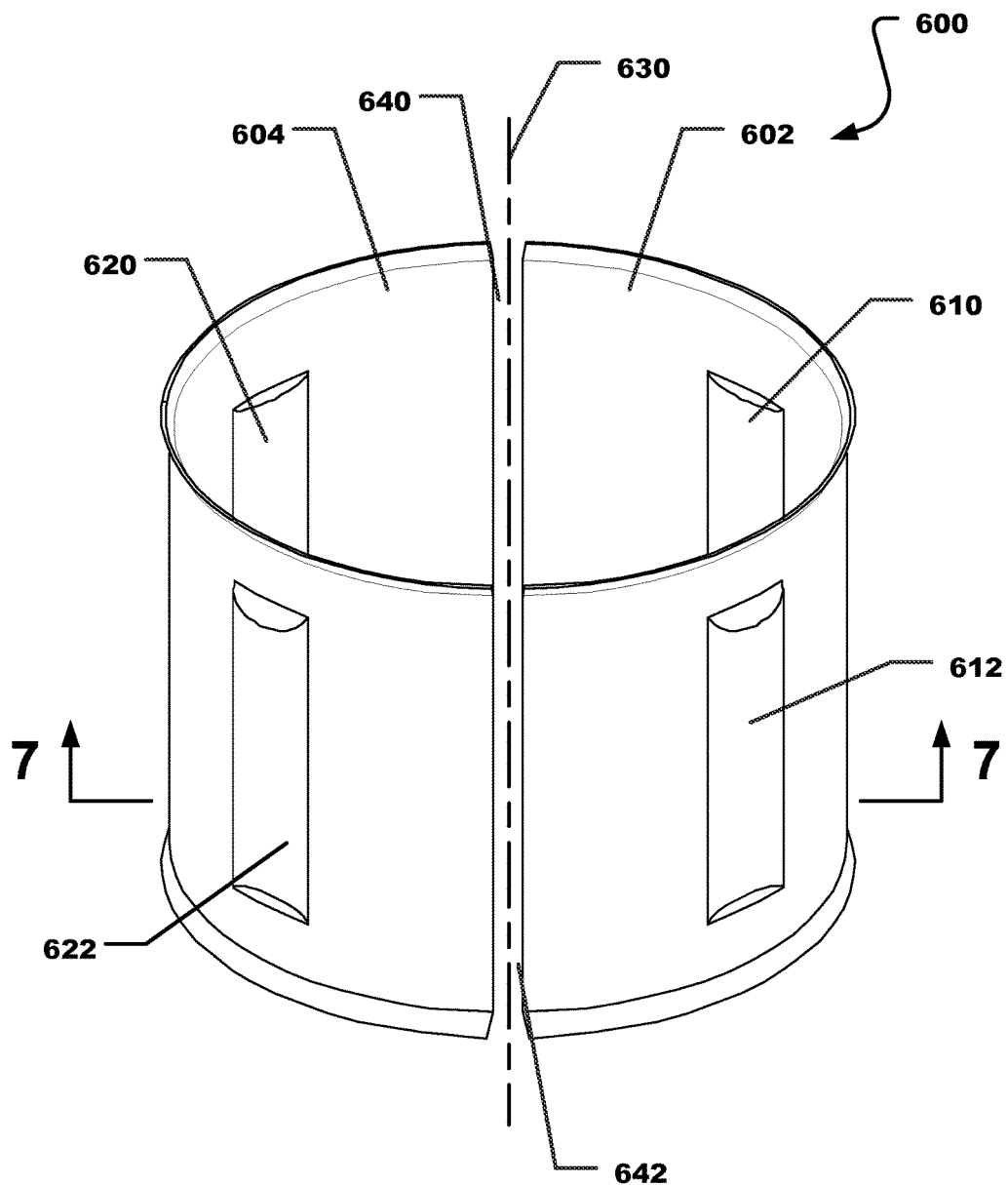
FIG. 6 includes a perspective view of a tolerance ring in accordance with another embodiment.
Figure 7:
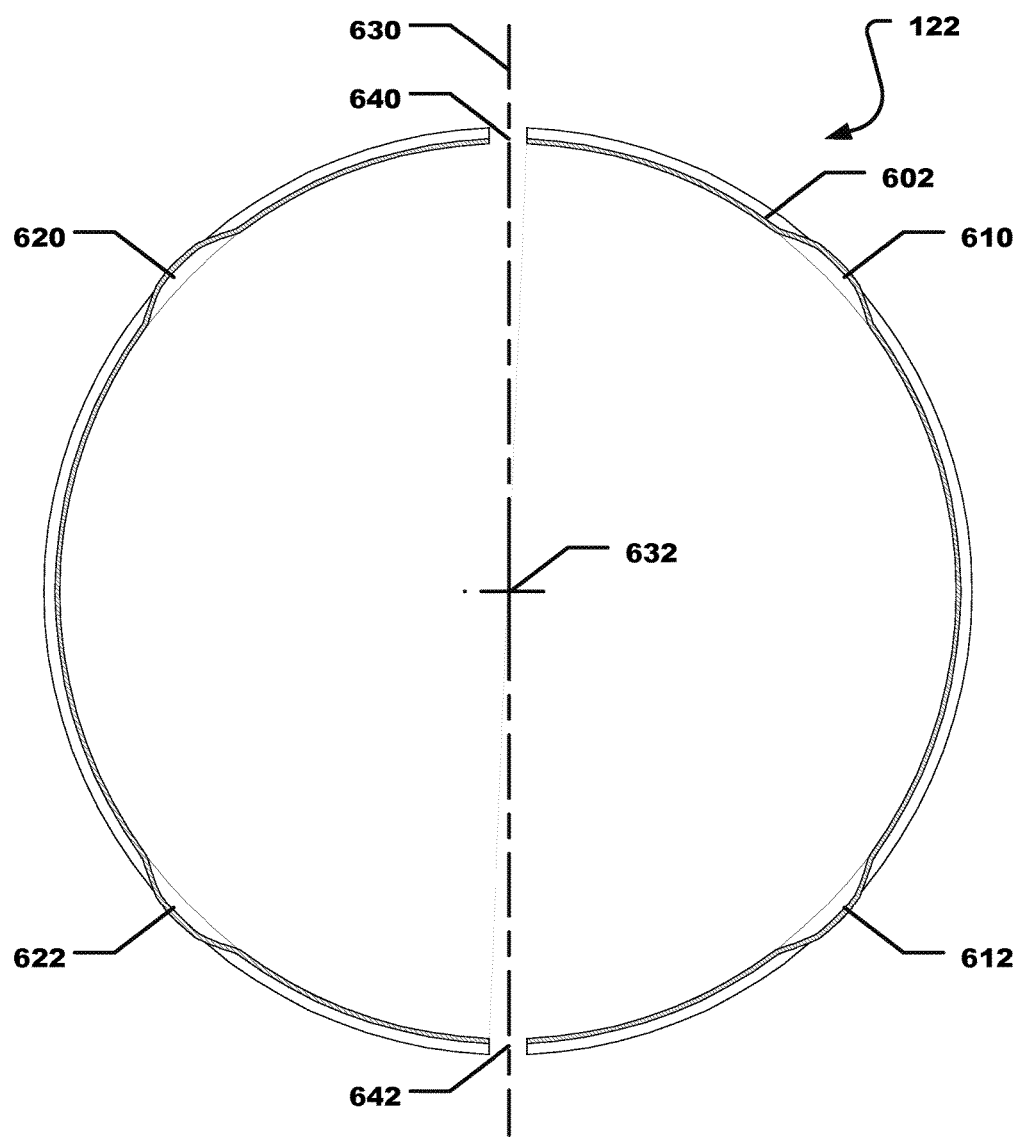
FIG. 7 includes a cross-sectional view of a tolerance ring in accordance with an embodiment taken along Line 7-7 in FIG. 6.

Referring to FIG. 6, another aspect of a tolerance ring is illustrated and designated 600. The tolerance ring 600 includes a first sidewall 602 and a second sidewall 604. The first sidewall 602 can include a first wave structure 610 and a second wave structure 612. The second sidewall 604 can include a third wave structure 620 and a fourth wave structure 622. In this aspect, each sidewall 602, 604 can include only two wave structures 610, 612, 620, 622 and the wave structures 610, 612, 620, 622 can be equally spaced around the circumference of the tolerance ring 600.

For example, as illustrated, a line passing through the center 630 of the tolerance ring 600 and bisecting each wave structure, respectively, can form an angle, α, with respect to a central axis 632 passing through the center 630 of the tolerance ring 600 and bisecting the gaps 640, 642. In a particular aspect, the first wave structure 610 can be located such that α can be 45°±5°, the second wave structure 612 can be located such that α can be 135°±5°, the third wave structure can be located such that α can be 225°±5°, and the fourth wave structure can be located such that α can be 315°±5°.

FIG. 6 indicates that each sidewall 602, 604 can be symmetric about an axis passing through the center 630. Further, as illustrated, each wave structure 610, 612, 614, 616 can include an elongated wave. As depicted in 8, a tolerance ring 800 can include a plurality of wave structures 810, 812, 814, 816 and each wave structure can include a wave column having an upper wave and a lower wave. The upper wave and lower wave can be vertically aligned and can be located along the tolerance ring 800 in a manner substantially the same as the elongated waves on the tolerance ring 600 described above.

Figure 8:
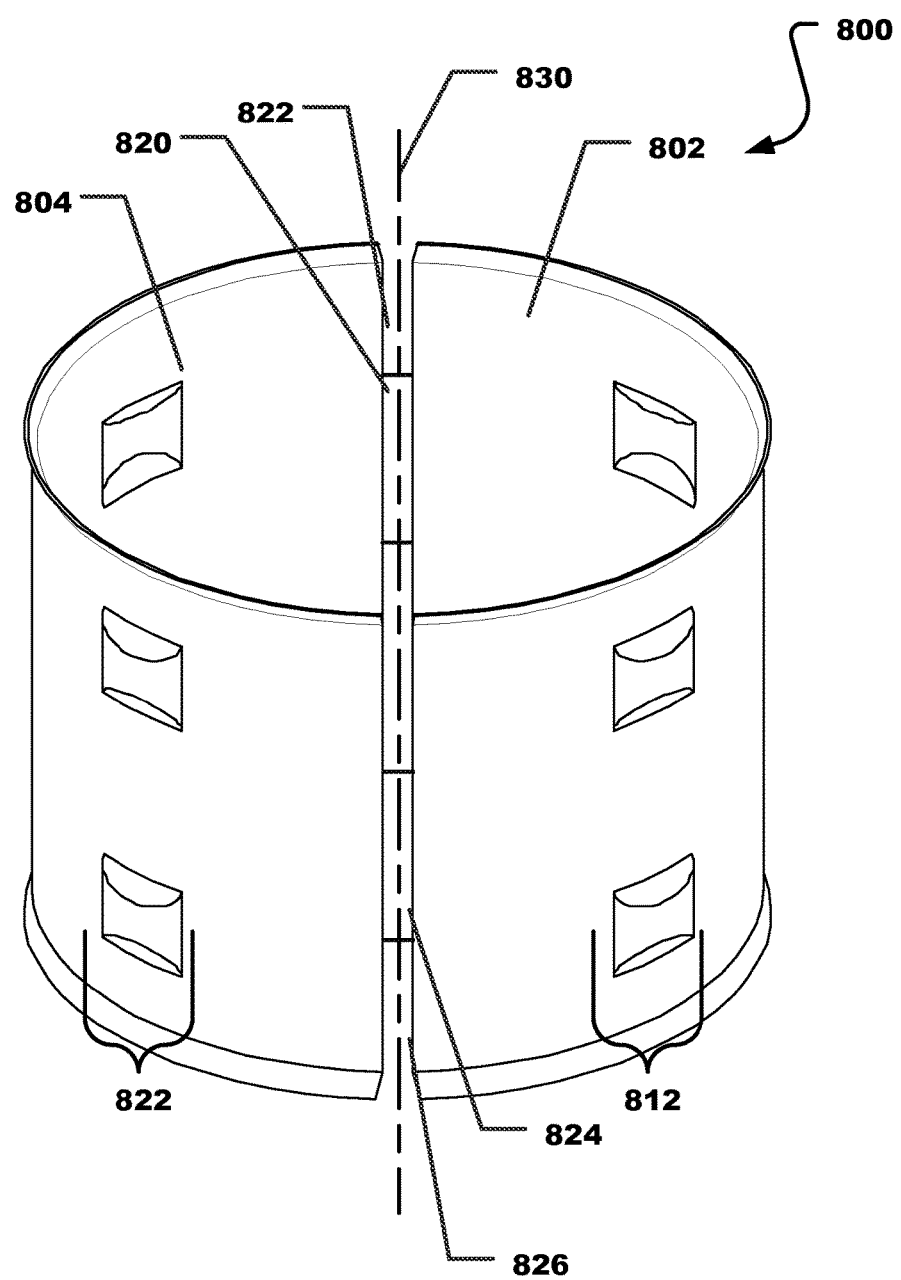
FIG. 8 includes a perspective view of a tolerance ring in accordance with still another embodiment.

FIG. 8 indicates that the tolerance ring 800 can include a first assembly spacer 820 bridging a first gap 822 and a second assembly spacer 824 bridging a second gap 826. The spacers 820, 824 can be used to facilitate assembly of the tolerance ring 800 around a drive shaft or within a bore. Further, after installation is complete and the tolerance ring 800 is installed between an inner component and an outer component, the spacers 820, 824 can be removed. Alternatively, the spacers 820, 824 can be removed during installation. Further, the spacers can be constructed from a polymer. Further, the spacers can be constructed from a dissolvable polymer film. For example, the dissolvable polymer film can include a water-soluble film of polyvinyl alcohol, polyvinyl pyrrolidone, methylcellulose, cellulose acetate, polyethylene oxide, gelatin, partially saponified polyvinyl alcohol, CMC, dextrin, starch, hydroxyethyl cellulose, agar, pectin, or a combination thereof.

In a particular aspect, the first assembly spacer 820 and the second assembly spacer 824 can include a first wall stiffness, $S_1$, and the sidewalls 830, 832 of the tolerance ring 800 can include a second wall stiffness, $S_2$. $S_1$ can be $\leq S_2$, such as $\leq 20\% S_2$, $\leq 15\% S_2$, $\leq 10\% S_2$, or $\leq 5\% S_2$. Further, $S_1$ can be $\geq 0.1\% S_2$, such as $\geq 0.5\% S_2$, $\geq 1.0\% S_2$, $\geq 1.5\% S_2$, $\geq 2.0\% S_2$, or $\geq 2.5\% S_2$. $S_1$ can also be within a range between and including any of the percentage of $S_2$ values described above.

Figure 9:
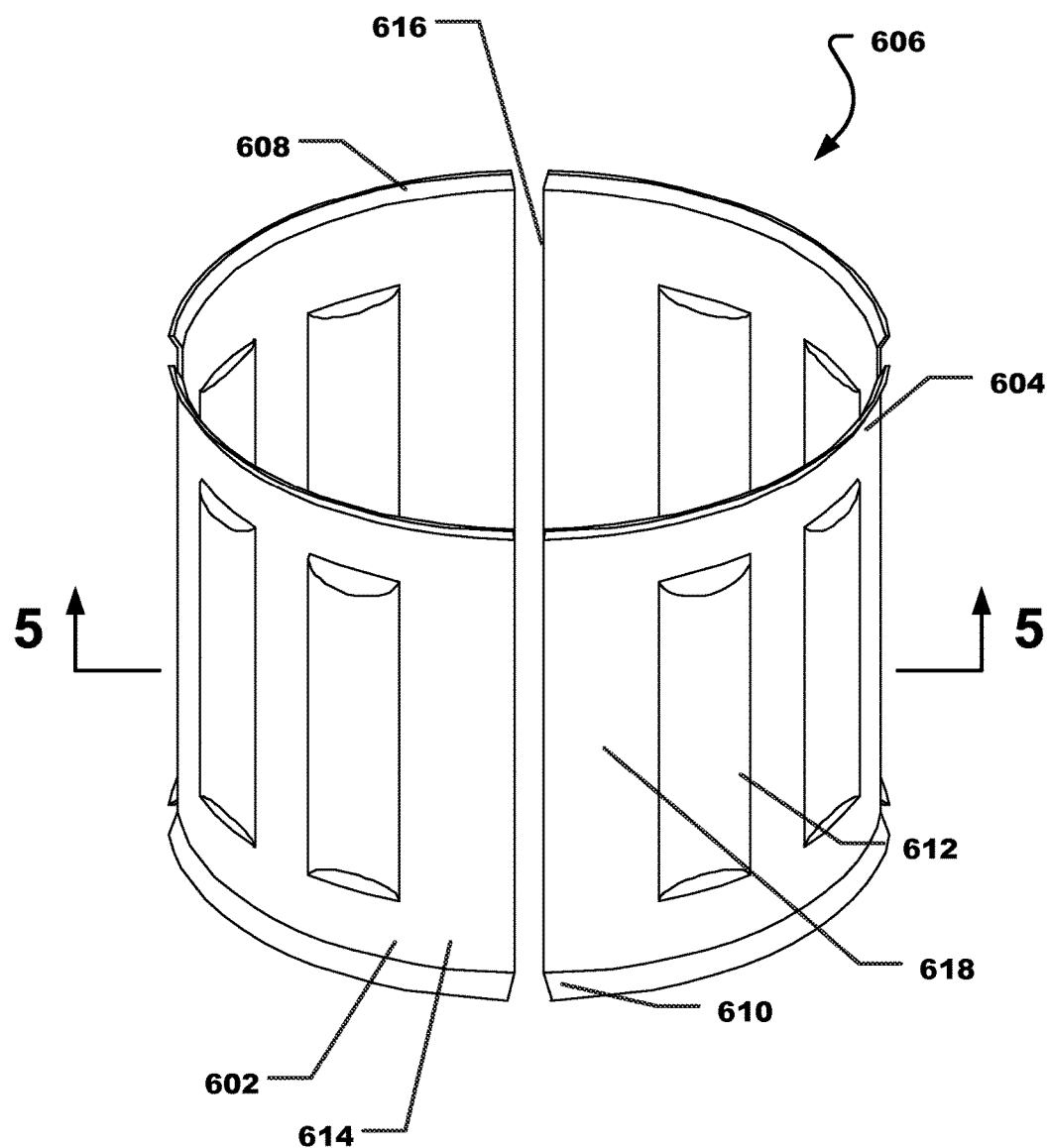
FIG. 9 includes a perspective view of a tolerance ring in accordance with yet another embodiment.
Figure 10:
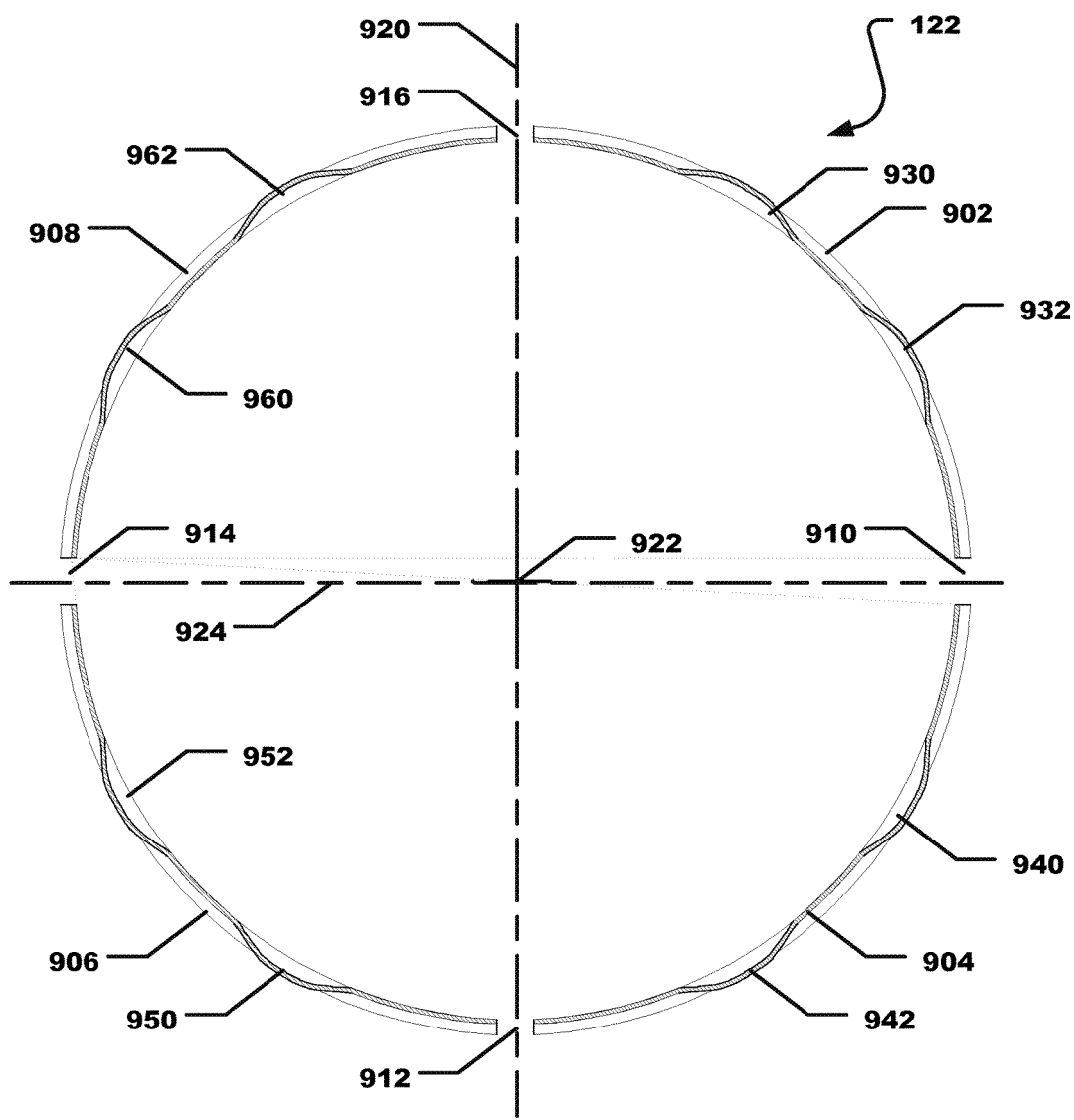
FIG. 10 includes a cross-sectional view of a tolerance ring in accordance with an embodiment taken along Line 10-10 in FIG. 9.

Referring now to FIG. 9 and FIG. 10, a tolerance ring is shown and is designated 900. The tolerance ring 900 can include a first partial-cylindrical sidewall 902, a second partial-cylindrical sidewall 904, a third partial-cylindrical sidewall 906, and a fourth partial-cylindrical sidewall 908. Each sidewall 902, 904, 906, 908 can include a first end and a second end.

A first gap 910 can be established between the ends of the first sidewall 902 and the second sidewall 904. A second gap 912 can be established between the ends of the second sidewall 904 and the third sidewall 906. A third gap 914 can be established between the ends of the third sidewall 906 and the fourth sidewall 908. Also, a fourth gap 916 can be established between the ends of the fourth sidewall 908 and the first sidewall 902. The first gap 910 can be opposite the third gap 914 and the second gap 912 can be opposite the fourth gap 916. Further, a first axis 920 that passes through the center 922 of the tolerance ring 900 and bisects the first gap 910 and the third gap 914 can be substantially perpendicular to a second axis 924 that passes through the center 922 of the tolerance ring 900 and bisects the second gap 912 and the fourth gap 916.

Still referring to FIG. 9 and FIG. 10, the first sidewall 902 can include a first wave structure 930 and a second wave structure 932. The second sidewall 904 can include a third wave structure 940 and a fourth wave structure 942. The third sidewall 906 can include a fifth wave structure 950 and a sixth wave structure 952. The fourth sidewall 908 can include a seventh wave structure 960 and an eighth wave structure 962.

In this aspect, the wave structures 930, 932, 940, 942, 950, 952, 960, 962 can be equally spaced around the circumference of the tolerance ring 900. For example, as illustrated, a line passing through the center 922 of the tolerance ring 900 and bisecting each wave structure, respectively, can form an angle, α, with respect to the first axis 920. In a particular aspect, the first wave structure 930 can be located such that α can be 30°±5°, the second wave structure 932 can be located such that α can be 60°±5°, the third wave structure 940 can be located such that α can be 120°±5°, the fourth wave structure 942 can be located such that α can be 150°±5°, the fifth wave structure 950 can be located such that α can be 210°±5°, the sixth wave structure 952 can be located such that α can be 240°±5°, the seventh wave structure 960 can be located such that α can be 300°±5°, and the eighth wave structure 962 can be located such that α can be 330°±5°.

FIG. 10 indicates that each sidewall 902, 904, 906, 908 can be symmetric about an axis that passes through the center 922 of the tolerance ring 900 and bisects each sidewall 902, 904, 906, 908. Further, as illustrated, each wave structure 930, 932, 940, 942, 950, 952, 960, 962 can include an elongated wave that extends at least partially along the length of the tolerance ring 900.

Figure 11:
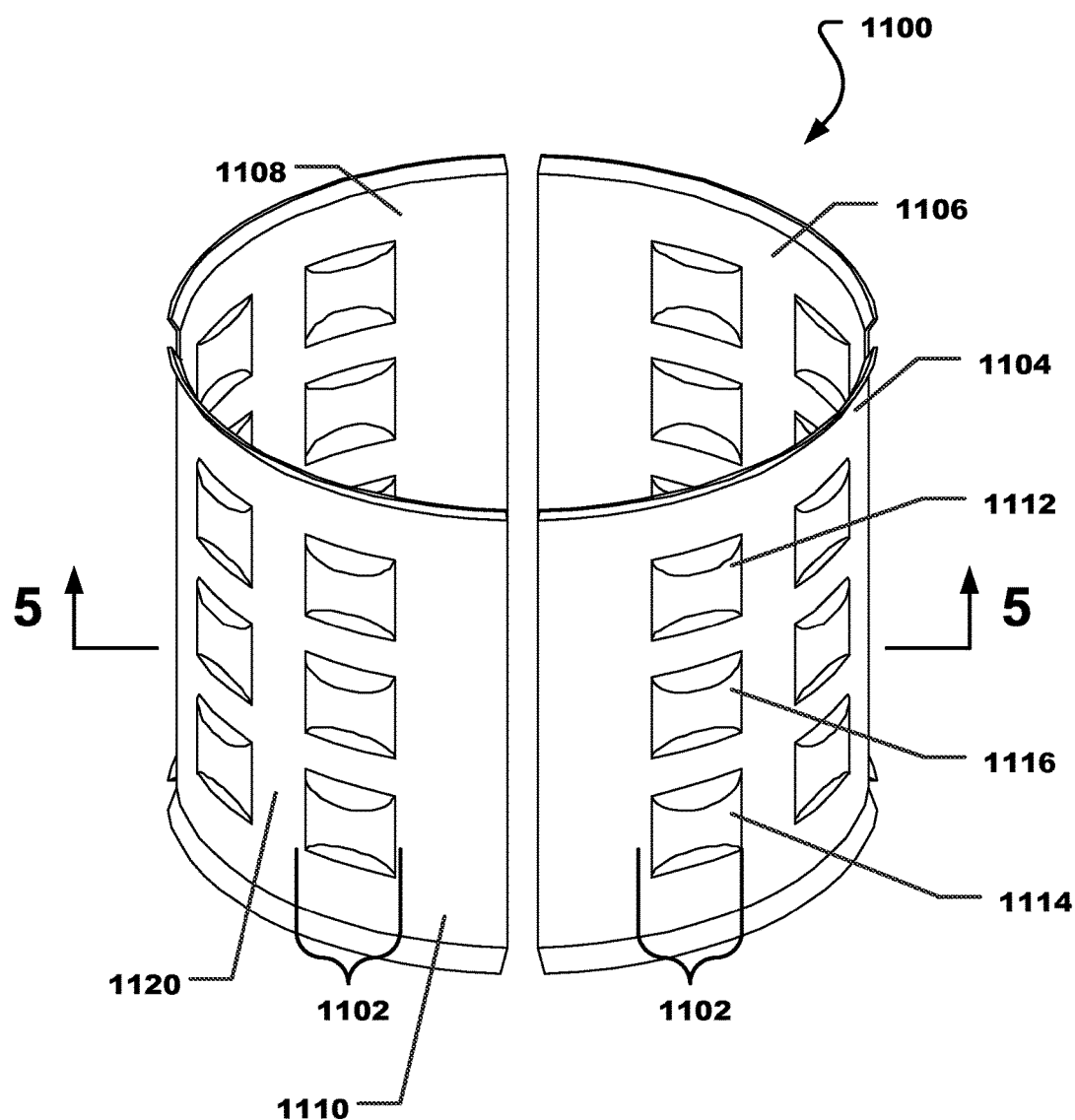
FIG. 11 includes a perspective view of a tolerance ring in accordance with another embodiment.
Figure 12:
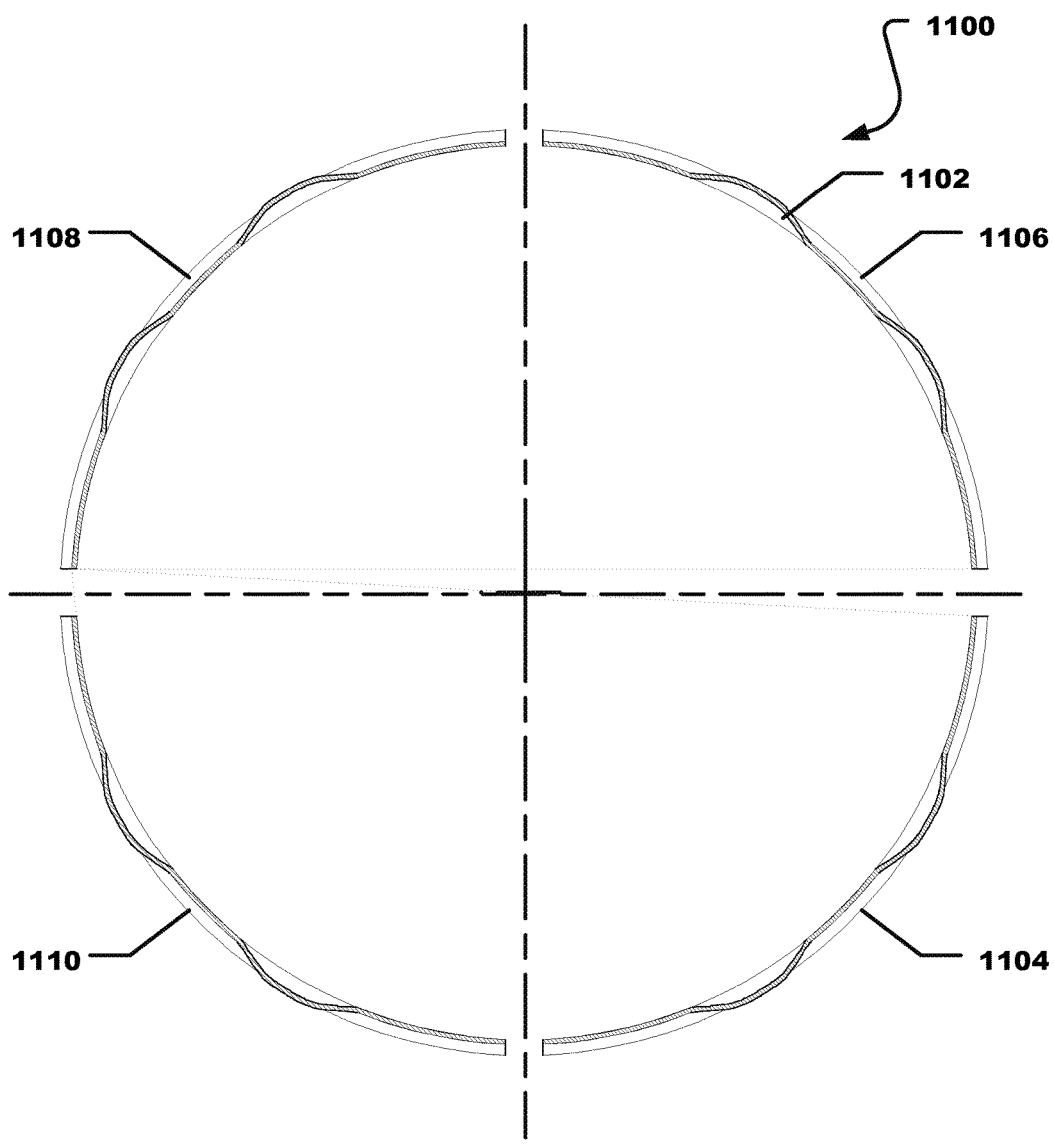
FIG. 12 includes a cross-sectional view of a tolerance ring in accordance with an embodiment taken along Line 12-12 in FIG. 11.
Figure 13:
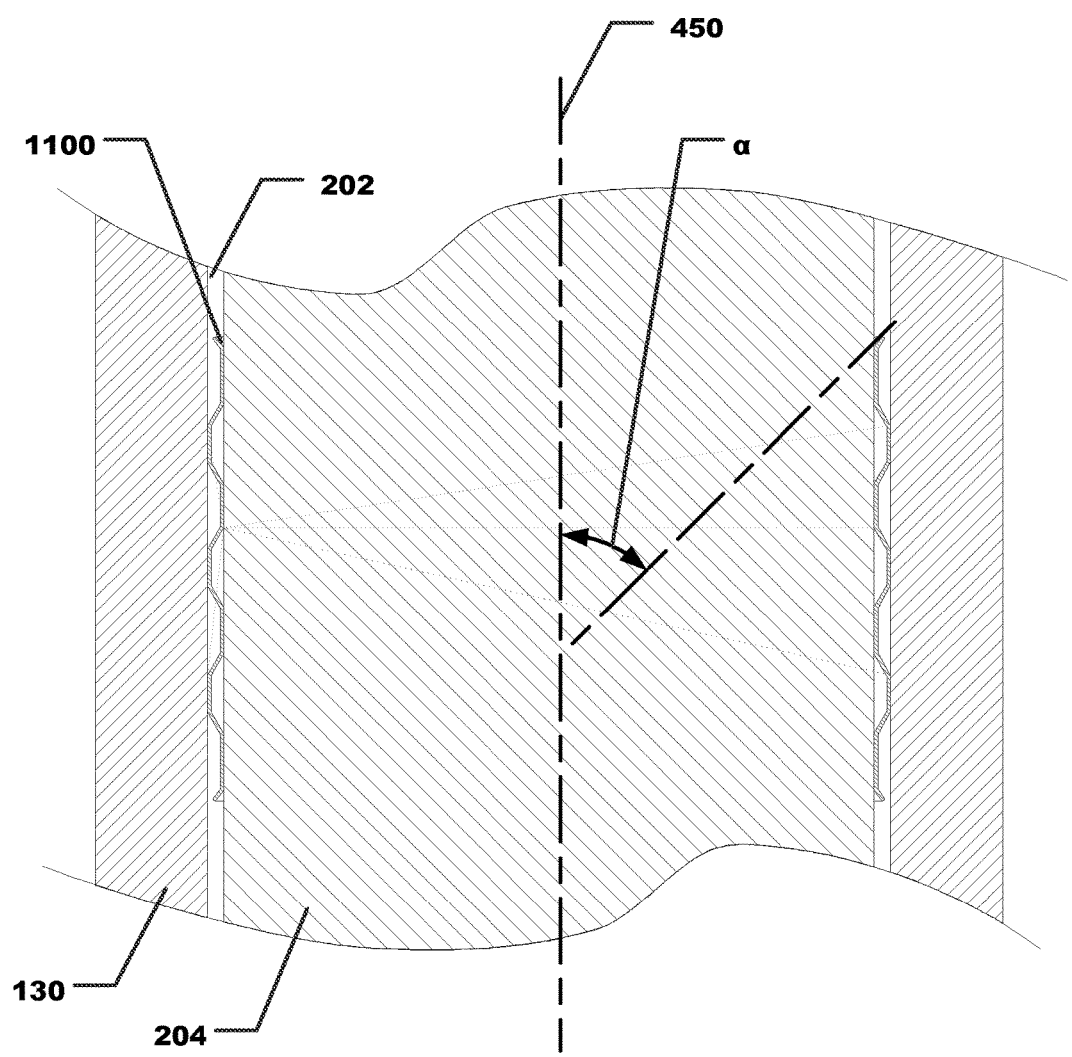
FIG. 13 includes a cross-sectional view of a tolerance ring in accordance with an embodiment.

As illustrated in FIG. 11 through 13, in a particular aspect, a tolerance ring 1100 can include a plurality wave structures 1102 circumferentially spaced along each sidewall 1104, 1106, 1108, 1110. Each wave structure 1102 can include a wave column and each wave column can include a first wave 1112 near a top of a sidewall 1104, 1106, 1108, 1110 and a second wave 1114 near a bottom of a sidewall 1104, 1106, 1108, 1110 of the tolerance ring 1100.

In a particular aspect, the first wave 1112 can be centered within the top half of the length of the tolerance ring 1100. Moreover, the second wave 1114 can be centered within the bottom half of the length of the tolerance ring 1100. Each wave column can also include a third wave 1116 between the first wave 1112 and the second wave 1114. The third wave 1116 can be centered along the length of the tolerance ring 1100.

In one aspect, the first wave 1112 can be the same size as the second wave 1114, e.g., length, width, height (measured from the outer surface of the sidewall 304). In another aspect, the first wave 1112, the second wave 1114, and the third wave 1116 are the same size, e.g., length, width, height (measured from the outer surface of the sidewall 1104, 1106, 1108, 1110).

In particular, the first wave 1112 and the second wave 1114 can have a first length, $L_1$, and the third wave 1116 can include a second length, $L_2$, and $L_2 \leq L_1$. Specifically, $L_2$ can be $\leq 75\%$ $L_1$, such as $L_2 \leq 70\%$ $L_1$, $L_2 \leq 65\%$ $L_1$, $L_2 \leq 60\%$ $L_1$, $L_2 \leq 55\%$ $L_1$, or $L_2 \leq 50\%$ $L_1$. In another aspect, $L_2$ can be $\geq 25\%$ $L_1$, such as $L_2 \geq 30\%$ $L_1$, $L_2 \geq 35\%$ $L_1$, or $L_2 \geq 40\%$ $L_1$. In another aspect, $L_2$ can be within a range between, and including, any of the percentage values of $L_1$ disclosed above.

FIG. 11 through FIG. 13 also indicate that each sidewall 1104, 1106, 1108, 1110 of the tolerance ring 1100 can include a plurality of unformed sections 1120. Each unformed section 1120 can comprise a section of the sidewall 1104, 1106, 1108, 1110 that extends between adjacent wave columns and is not formed with any waves or other structures. Moreover, each unformed section 1120 can extend between adjacent wave columns between an upper flange and a lower flange of the tolerance ring 1100 without any additional structure or feature formed between the flanges.

As indicated in FIG. 12, the wave structures 1102 and the unformed sections 1120 can alternate around the circumference of each sidewall 1104, 1106, 1108, 1110. Moreover, in a particular aspect, the wave structures 1102 are evenly spaced along the circumference of each sidewall 1104, 1106, 1108, 1110 by the unformed sections 1120 of each sidewall 1104, 1106, 1108, 1110.

In a particular aspect, a tolerance ring formed according to any of the aspects described herein and having multiple gaps can a concentricity, C. A single gap tolerance ring formed exactly like the multiple gap tolerance ring, but having only a single gap and not two or more opposing gaps, can have a concentricity, $C_{SG}$. In a particular aspect, C can be $\leq 30\%$ $C_{SG}$, such as $\leq 25\%$ $C_{SG}$, $\leq 24\%$ $C_{SG}$, $\leq 23\%$ $C_{SG}$, $\leq 22\%$ $C_{SG}$, $\leq 21\%$ $C_{SG}$, $\leq 20\%$ $C_{SG}$, $\leq 19\%$ $C_{SG}$, or $\leq 18\%$ $C_{SG}$. Further, C can be $\geq 5\%$ $C_{SG}$, such as $\geq 10\%$ $C_{SG}$, or $\geq 15\%$ $C_{SG}$. C can also be within a range between and including any of the percentage of $C_{SG}$ values describe above.

In a particular aspect, a tolerance ring according to any of the aspects described herein can be made from a metal, a metal alloy, or a combination thereof. The metal can include a ferrous metal. Further, the metal can include steel. The steel can include stainless steel, such as austenitic stainless steel. Moreover, the steel can include stainless steel comprising chrome, nickel, or a combination thereof. For example, the steel can X10CrNi18-8 stainless steel. Further, the tolerance ring can include a Vickers pyramid number hardness, VPN, which can be $\geq 350$, such as $\geq 375$, $\geq 400$, $\geq 425$, or $\geq 450$. VPN can also be $\leq 500$, $\leq 475$, or $\leq 450$. VPN can also be within a range between, and including, any of the VPN values described herein. In another aspect, the tolerance ring can be treated to increase its corrosion resistance. In particular, the tolerance ring can be passivated. For example, the tolerance ring can be passivated according to the ASTM standard A967. In another aspect, the steel can include carbon steel.

In another aspect, the stock material from which the tolerance ring can be formed can have a thickness, t, and t can be $\geq 0.1$ mm, such as $\geq 0.15$ mm, $\geq 0.2$ mm, $\geq 0.25$ mm, $\geq 0.3$ mm, $\geq 0.35$ mm, or $\geq 0.4$ mm. In another aspect, t can be $\leq 1.0$ mm, $\leq 0.75$ mm, $\leq 0.7$ mm, or $\leq 0.6$ mm. Moreover, t can be within a range between, and including, any of the values of t disclosed above.

The tolerance ring according to any of the aspects described herein may have an overall outer diameter, OD, and OD can be $\geq 5.0$ mm, $\geq 6.0$ mm, such as $\geq 7.0$ mm, $\geq 8.0$ mm, $\geq 9.0$ mm, $\geq 10.0$ mm, $\geq 11.0$ mm, $\geq 12.0$ mm, $\geq 13.0$ mm, $\geq 14.0$ mm, $\geq 15.0$ mm, $\geq 16.0$ mm, $\geq 17.0$ mm, $\geq 18.0$ mm, $\geq 19.0$ mm, or $\geq 20.0$ mm. The OD can be $\leq 100.0$ mm, such as $\leq 90.0$ mm, $\leq 80.0$ mm, $\leq 70.0$ mm, $\leq 60.0$ mm, $\leq 50.0$ mm, $\leq 40.0$ mm, or $\leq 30.0$ mm. Further, OD can be within a range between and including any of the values of OD described herein.

The tolerance ring according to any of the aspects described herein may have an overall inner diameter, ID, and ID can be $\geq 3.0$ mm, such as $\geq 4.0$ mm, $\geq 5.0$ mm, $\geq 6.0$ mm, $\geq 7.0$ mm, $\geq 8.0$ mm, $\geq 9.0$ mm, $\geq 10.0$ mm, $\geq 11.0$ mm, $\geq 12.0$ mm, $\geq 13.0$ mm, $\geq 14.0$ mm, $\geq 15.0$ mm, $\geq 16.0$ mm, $\geq 17.0$ mm, $\geq 18.0$ mm, $\geq 19.0$ mm, or $\geq 20.0$ mm. The ID can be $\leq 100.0$ mm, such as $\leq 90.0$ mm, $\leq 80.0$ mm, $\leq 70.0$ mm, $\leq 60.0$ mm, $\leq 50.0$ mm, $\leq 40.0$ mm, or $\leq 30.0$ mm. Further, ID can be within a range between and including any of the values of ID described herein.

In another aspect, the tolerance ring can have an overall length, L, and L can be $\geq 5.0$ mm, $\geq 6.0$ mm, $\geq 7.0$ mm, $\geq 8.0$ mm, $\geq 9.0$ mm, $\geq 10.0$ mm, $\geq 11.0$ mm, $\geq 12.0$ mm, $\geq 13.0$ mm, $\geq 14.0$ mm, $\geq 15.0$ mm, $\geq 16.0$ mm, $\geq 17.0$ mm, $\geq 18.0$ mm, $\geq 19.0$ mm, or $\geq 20.0$ mm. Also, L can be $\leq 100.0$ mm, such as $\leq 90.0$ mm, $\leq 80.0$ mm, $\leq 70.0$ mm, $\leq 60.0$ mm, $\leq 50.0$ mm, $\leq 40.0$ mm, or $\leq 30.0$ mm. Moreover, L can be within a range between, and including, any of the values of L described above.

Additionally, after the stock material that is used to form any of the tolerance rings described herein is cut, stamped, and rolled to form the tolerance ring, the resulting tolerance ring is substantially free of any burrs.

EXAMPLES

Three tolerance rings are manufactured from X10CrNi18-8 stainless steel stock. The stainless steel stock has a thickness of 0.4 mm±0.013. Further, the stainless steel stock has a VPN of 400-450 and is passivated to ASTM A967. Each tolerance ring has a single cylindrical sidewall with a single gap to approximate the prior art.

Each tolerance ring includes eighteen elongated waves that are parallel to a longitudinal axis of the tolerance ring and equally spaced around the circumference of the first tolerance ring. Each tolerance ring has an OD of approximately 16 mm, an ID of approximately 14.5 mm, and a height of approximately 20 mm. Each wave on each tolerance ring is approximately 2.0 mm wide and 18.0 mm tall. Further, each tolerance ring has an overall wall thickness before installation of about 1.5 mm. After installation, each original tolerance ring includes a single gap that has a gap width of approximately 1.5 mm.

Each tolerance ring is installed around a shaft having an outer diameter of 14.7 mm and this assembly is installed within a solid ring having a bore of approximately 16.0 mm. This shaft/ring assembly is installed within a milled V block so that the shaft is supported in the V block and a depth gauge is place adjacent to and touching the outer perimeter of the solid ring. The shaft/ring assembly is rotated and during rotation, the displacement of the outer perimeter of the ring is measured by the gauge and recorded.

Then, each tolerance ring is removed from the assembly and each tolerance ring constructed as described above (original) is machined, or otherwise cut, so that each tolerance ring is modified to include a first sidewall, a second sidewall, a first gap, and a second gap, according to the present disclosure. Each of the modified tolerance rings includes nine elongated waves formed on each sidewall. Each modified tolerance ring is installed between the shaft and the ring, and tested again, as described above. After installation, each modified tolerance ring includes two opposing gaps and each gap has a gap width of approximately 0.75 mm.

The test results are summarized below in Table 1.

TABLE 1

| Concentricity | Original (one gap) | Modified (two gaps) |
|---|---|---|
| Ring One | 131 µm | 23 µm |
| Ring Two | 98 µm | 21 µm |
| Ring Three | 108 µm | 19 µm |

As illustrated above, the concentricity for each ring after being modified improved substantially. For ring one, the concentricity is reduced by 108 µm from 131 µm to 23 µm (82.44% improvement). For ring two, the concentricity is reduced by 77 µm from 98 µm to 21 µm (78.57% improvement). For ring three, the concentricity is reduced by 89 µm from 108 µm to 19 µm (82.40% improvement).

The tolerance rings according to embodiments described herein include multiple sidewalls separate by multiple gaps. Each of these multi-piece tolerance rings can provide a tolerance ring having a stiffness that is balanced on opposite pieces of the multi-piece tolerance ring. As such, a multi-piece tolerance ring in accordance with any of the embodiments herein, or combinations thereof, can provide a relatively precise concentricity between a drive shaft and a bore within an robot arm in which the drive shaft and tolerance ring are installed. As such, any load imbalances on the servomotor for the drive shaft can be substantially reduced and the life of the servomotor can be substantially increased.

Although the tolerances rings disclosed herein are described for use in robot devices, persons having ordinary skill in the art will recognize that these tolerance rings can be used in other precision devices in which a minimal concentricity is beneficial. Further, skilled artisans may recognize that there may be other applications that can utilize a tolerance ring having one or more of the characteristics described herein.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

In addition, in the foregoing Detailed Description, various features can be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter can be directed to less than all features of any of the disclosed embodiments. Thus, the following claims are incorporated into the Detailed Description, with each claim standing on its own as defining separately claimed subject matter.

What is claimed is:

1. A tolerance ring for installation within a bore, comprising:
a generally cylindrical assembly having a first body comprising a first partial-cylindrical sidewall and a first plurality of wave structures extending from the first partial-cylindrical sidewall, wherein the first plurality of wave structures are evenly circumferentially spaced along the perimeter of the first partial-cylindrical sidewall between a first end of the first partial-cylindrical sidewall and a second end of the first partial-cylindrical sidewall opposite the first end, and a second body comprising a second partial-cylindrical sidewall opposite the first partial-cylindrical sidewall and a second plurality of wave structures extending from the second partial-cylindrical sidewall, wherein the second plurality of wave structures are evenly circumferentially spaced along the perimeter of the second partial-cylindrical sidewall between a first end of the second partial-cylindrical sidewall and a second end of the second partial-cylindrical sidewall opposite the first end;
a first gap configured to be established between the first end of the first partial-cylindrical sidewall and the first end of the second partial-cylindrical sidewall as installed within the bore, wherein the first gap extends along the entire length of the tolerance ring such that a first split is formed in the tolerance ring;
a second gap configured to be established between the second end of the first partial-cylindrical sidewall and the second end of the second partial-cylindrical sidewall as installed within the bore, and wherein the second gap extends along the entire length of the tolerance ring such that a second split is formed in the tolerance ring, and wherein the first body and the second body are configured to be disconnected from each other as installed within the bores; and
a first assembly spacer bridging the first gap and a second assembly spacer bridging the second gap, wherein the first assembly spacer and the second assembly spacer are configured to be removed during or after installation of the tolerance ring, and wherein the first and second assembly spacers each comprise a material that is different from a material of the first partial-cylindrical sidewall and second partial cylindrical sidewall.

2. The tolerance ring of claim 1, wherein the tolerance ring is configured to provide an installed concentricity, C, ≤50 µm as installed within the bore.

3. The tolerance ring of claim 2, wherein 45 µm>C>5 µm.

4. The tolerance ring of claim 1, wherein the first gap is configured to include a first installed gap width, $GW_1$, and the second gap is configured to include a second installed gap width, $GW_2$, as installed within the bore, and wherein the $GW_1 \geq 95\%$ $GW_2$.

5. The tolerance ring of claim 1, wherein the first gap is configured to include a first installed gap width, $GW_1$, the second gap is configured to include a second installed gap width, $GW_2$, and the tolerance ring is configured to include an inner diameter, ID, as installed within the bore, and wherein $GW_1 = GW_2$, and a ratio, R, of ID to $GW_1 \geq 10:1$.

6. The tolerance ring of claim 1, wherein the first partial-cylindrical sidewall includes an equal number of wave structures as the second partial-cylindrical sidewall.

7. The tolerance ring of claim 6, wherein each of the first plurality of wave structures is opposed by one of the second plurality of wave structures to establish an opposed pair of wave structures.

8. The tolerance ring of claim 7, wherein each opposed pair of wave structures is configured to include a first installed engagement force, $F_1$, and a second installed engagement force, $F_2$, as installed within the bore, and wherein $F_1 \geq 95\% F_2$.

9. The tolerance ring of claim 1, wherein each wave structure comprises a wave column having multiple waves vertically aligned along a length of the tolerance ring.

10. The tolerance ring of claim 1, wherein the first assembly spacer and the second assembly spacer comprise a first wall stiffness, $S_1$, and the first partial-cylindrical sidewall and the second partial-cylindrical sidewall comprise a second wall stiffness, $S_2$, wherein $S_1 \leq S_2$.

11. The tolerance ring of claim 10, wherein $S_1 \geq 0.1\% S_2$.

12. An assembly comprising:
- an outer component including a bore within the outer component;
- an inner component disposed within the bore; and
- a tolerance ring installed in an annular space between the inner and outer components, the tolerance ring comprising:
- a generally cylindrical assembly having a first body comprising a first partial-cylindrical sidewall and a first plurality of wave structures extending from the first partial-cylindrical sidewall, wherein the first plurality of wave structures are evenly circumferentially spaced along the perimeter of the first partial-cylindrical sidewall between a first end of the first partial-cylindrical sidewall and a second end of the first partial-cylindrical sidewall opposite the first end, and a second body comprising a second partial-cylindrical sidewall opposite the first partial-cylindrical sidewall and a second plurality of wave structures extending from the second partial-cylindrical sidewall, wherein the second plurality of wave structures are evenly circumferentially spaced along the perimeter of the second partial-cylindrical sidewall between a first end of the second partial-cylindrical sidewall and a second end of the second partial-cylindrical sidewall opposite the first end;
- a first gap established between the first end of the first partial-cylindrical sidewall and the first end of the second partial-cylindrical sidewall, wherein the first gap extends along the entire length of the tolerance ring such that a first split is formed in the tolerance ring;
- a second gap established between the second end of the first partial-cylindrical sidewall and the second end of the second partial-cylindrical sidewall, wherein the second gap extends along the entire length of the tolerance ring such that a second split is formed in the tolerance ring, wherein the first body and the second body are disconnected from each other; and
- a first assembly spacer bridging the first gap and a second assembly spacer bridging the second gap, wherein the first assembly spacer and the second assembly spacer are configured to be removed during or after installation of the tolerance ring, and wherein the first and second assembly spacers each comprise a material that is different from a material of the first partial-cylindrical sidewall and second partial cylindrical sidewall.

* * * * *